Sept. 29, 1953 N. O. STIMSON 2,653,515
CORNEAL CONTACT LENS
Filed May 8, 1951 2 Sheets-Sheet 1

NOEL O. STIMSON,
INVENTOR.
HUEBNER, BEEHLER,
WORREL and HERZIG,
ATTORNEYS.
By Warren T. Jessup Sept. 29, 1953 N. O. STIMSON 2,653,515
CORNEAL CONTACT LENS
Filed May 8, 1951 2 Sheets-Sheet 2
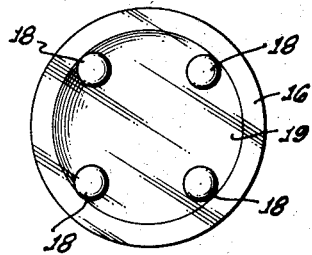
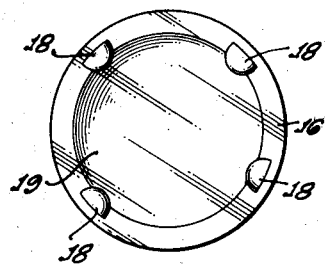
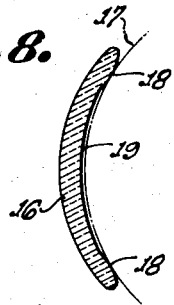
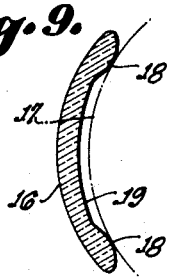
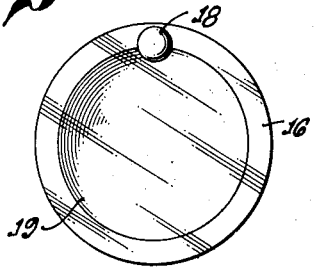
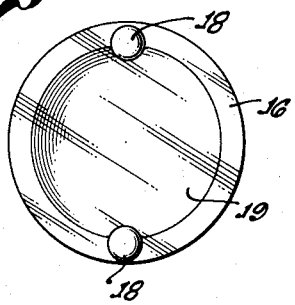
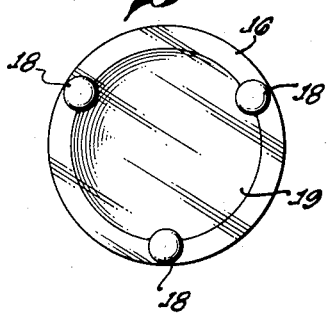
NOEL O. STIMSON,
INVENTOR.
HUEBNER, BEEHLER,
WORREL and HERZIG,
ATTORNEYS.
By Warren T. Jessup Patented Sept. 29, 1953

2,653,515

UNITED STATES PATENT OFFICE 2,653,515

CORNEAL CONTACT LENS

Noel O. Stimson, Los Angeles, Calif.

Application May 8, 1951, Serial No. 225,135

4 Claims. (Cl. 88—54.5)

This invention relates to contact lenses, particularly corneal contact lenses adapted to abut the cornea of the human eye.

Contact lenses have been under development for many years past. Earlier lenses covered virtually the entire front surface of the eyeball including the cornea and sclera, with the pressure of the lens being borne by the sclera. A recent trend has been toward corneal contact lenses, that is, those which are large enough to cover only the cornea, leaving the sclera substantially uncovered. These lenses have the advantage of relieving pressure from the sclera and allowing it free access to the air.

It is the primary object of this invention to provide an improved corneal contact lens.

A major problem in the use of corneal contact lenses is their tendency to rotate with eye movements and eventually work themselves into a position where they drop out of the eye with continued eye movements and blinking. It is, accordingly, an object of the instant invention to provide a corneal contact lens which will maintain itself in position better than prior art lenses.

Since rotation of the lens affects any astigmatic correction in the lens system, such rotation is undesirable, even though there were no consequent tendency of the lens to work itself out from the eye. It is therefore another object of the instant invention to provide an improved corneal contact lens having decreased tendency to rotate in its setting against the eyeball.

It is another object of the instant invention to provide a contact lens in which manufacturing tolerances may be much greater without detracting from the satisfactory characteristics of the completed lens.

It is a further object of this invention to provide a contact lens which does not require the use of special saline solution between lens and eyeball, but makes use of the natural eye fluids.

A further object of the instant invention is to provide a contact lens which obviates drying of the cornea associated with prior corneal contact lenses, by allowing normal tear or lachrymal flow.

In accordance with these, and with other objects which will become apparent hereinafter, the instant invention will now be described.

Prior art lenses tacitly assume—incorrectly—that the average cornea is a surface of revolution symmetrical about a horizontal axis coincident with the optical axis passing centrally through the cornea. Thus, such lenses account for only one meridian or radius—of necessity the greater radius. They thus are able to rotate freely about the cornea with the consequent disadvantages noted above.

In accordance with the instant invention a corneal lens is fabricated, in which the concave posterior surface is not spherical, paraboloidal, nor other surface of revolution about the lens axis, but is instead toroidal. That is, the concavity has a given radius in the horizontal meridian and a different radius, generally smaller, in the vertical meridian.

Further, in accordance with the instant invention, the posterior concavity is provided with one or more discrete areas which extend out from the general concave contour. These protuberant areas, or bosses, may be of any degree of protuberance. They may be formed, for example, merely by making the radius of the discrete area larger than the radius of the contiguous concave surface. The effect then is to produce a small discrete area which protrudes out from the general contour of the concavity even though this discrete area may in fact be concave itself. When the above mentioned larger radius becomes infinite, the protuberance becomes a flat surface, or facet. Continuing further, if the radius is made negative, i. e., if the center of curvature is anterior of the corneal lens instead of posterior thereof, the area has a convex surface, in the nature of a more conventional boss.

It is to be understood that throughout this specification and appended claims where the term "protuberant area" is used, there is meant any area which extends out from the general concave contour of the posterior surface of the lens.

The above described protuberant areas, or facets, abut the convex surface of the cornea. Since the posterior concavity of the lens is formed to match as closely as possible the corresponding convexity of the cornea, the facets or protuberances constitute the only portions of the lens which actually contact the cornea. These protuberances create a thin space between the cornea and the greater portion of the lens, which space is filled with a thin film of lachrymal fluid, that renders wearing of these lenses infinitely more comfortable than prior art flush contact lenses.

In some cases the anterior surface of the cornea of the human eye is formed substantially as a surface of revolution about a horizontal axis coincident with the optic axis of the eye. The generatrix of this surface of revolution may be a circle or may be a parabola, or other curve. When such a cornea is encountered, a corneal contact lens is prepared by forming a spherical, paraboloidal, or other matching concavity at the posterior surface of the corneal contact lens.

It is more common, however, for the cornea to be generally toroidal, that is to say, the anterior surface of the cornea follows generally the surface of a tore or torus. The toroidal surface of such a typical cornea may be visualized by imagining a circle disposed in a vertical plane. If now a vertical axis is passed through the circle displaced slightly from the center of the circle, the smaller segment discarded, and the larger segment rotated about said vertical axis; there will be formed a toroidal surface representing generally the nature of the anterior surface of a typical human cornea. The cornea itself constitutes but a small segment of such a tore, such segment being formed by passing a vertical plane through the toric surface so as to slice off a small segment. It will now be seen that the surface thus under consideration is not a surface of revolution about a horizontal axis coinciding with the optic axis of the cornea, but instead this surface has a radius in the horizontal meridian which is slightly greater than the radius in the vertical meridian.

It is to be understood that when the term "toroidal" or "toric" is used herein, there is meant a surface having the properties described immediately above. Such a surface may be either the convex surface of the cornea or the concave posterior surface of a corneal lens constructed in accordance with the instant invention, as will be apparent from the context hereinafter.

In accordance with the instant invention a corneal contact lens is formed having a toroidal concavity corresponding generally to the toroidal convexity of the cornea to which it is to be fitted. Further, in accordance with the instant invention, the concavity of the instant invention may be provided with the protuberant areas or facets described hereinbefore. In either case, whether the toroidal concavity or the facets are used, such a lens when placed against a toroidal cornea, tends to seat itself on the cornea in such a manner that rotation of the contact lens about the optic axis of the eye is substantially prevented. Should rotation tend to occur through eye movement and blinking, there will be a tendency for a portion of the contact lens to lift away from the cornea, thus bringing into play a counter-rotative torque tending to rotate the lens back into its proper position.

To more readily appreciate this phenomenon, image a conventional door knob installed in a door. The upper surface of the door knob now represents the toric cornea of a human eye with the optic axis pointed vertically upward. Now imagine a cap having a convexity molded to fit snugly atop the door knob. Such a cap would have a toric concavity similar to the toric concavity forming the posterior surface of a lens constructed in accordance with the instant invention. If now, this cap is rotated slightly about the vertical axis (the optic axis of the eye) the cap will tend to be lifted from the door knob and there will be brought into play, as one presses down on the cap, a tendency to counter-rotate the cap and re-seat it in its flush position atop the door knob.

A similar phenomenon occurs in the case of a corneal contact lens having a toric concavity as discussed herein. Eye movement and blinking may cause the lens to rotate slightly about the optic axis, but the pressure of the eyelid against the lens effects a counter-rotative force to re-seat the lens properly against the cornea.

Let us now imagine the same door knob without the cap. Atop it we place a miniature four-legged stool. The stool seats itself with the diagonals connecting opposite legs situated angularly midway, i. e., at 45°, with respect to the major and minor meridians of the surface. This corresponds to the four-facet lens of the instant invention. Rotate this stool slightly about a vertical axis and it will be readily seen that two of the legs will tend to lift away from the top surface of the door knob. As described hereinbefore, downward pressure on the stool brings into play a counter-rotative force tending to re-seat the stool on the door knob with the four legs positioned angularly midway between the two meridians of the toric door knob surface.

A similar action occurs with the herein described four-facet contact lens.

The two features of the instant invention may be employed separately or may be employed together. That is, the contact lens may be formed with a toroidal posterior concavity with the protuberant areas or facets; or the concavity may be of any suitable shape, as for example spherical or paraboloidal, and have thereon the protuberant areas or facets of the instant invention; or the lens may be formed with a toroidal concavity which has in addition the protuberant areas or facets.

By way of example there will now be described in detail several representative species of the instant invention. Referring to the drawings:

Figs. 6 and 7 are views similar to Fig. 5, showing modifications of the instant invention.

Figs. 8 and 9 are sectional views illustrating variations in sizes of bosses.

Figs. 10, 11, and 12 illustrate modifications that may be employed in the number of bosses used on the lens.

Figure 1:
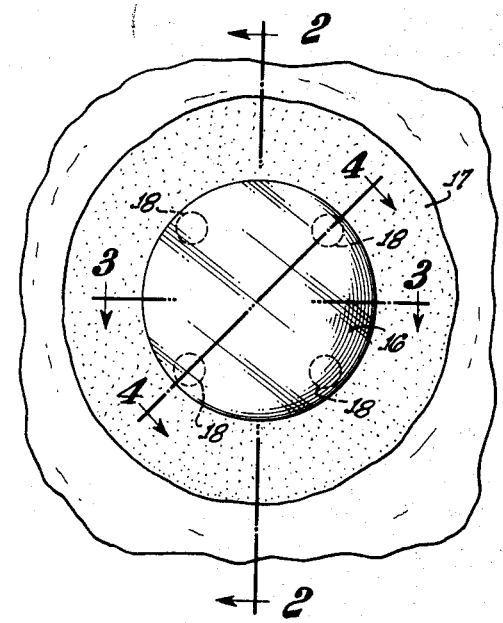
Fig. 1 is an elevational view showing a contact lens of the instant invention mounted against an eyeball.

Referring to Fig. 1, 16 designates a corneal contact lens having anterior and posterior surfaces, the latter being formed with a concavity 19 fitting generally against a cornea 17.

Figure 2:
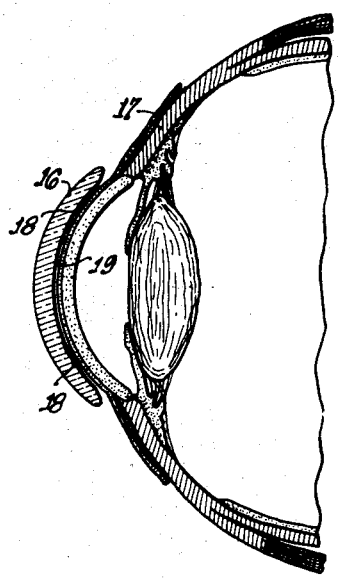
Fig. 2 is a sectional view taken on line 2—2 of Fig. 1.
Figure 3:
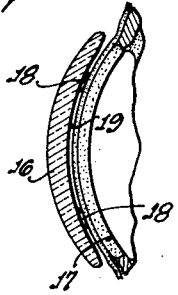
Fig. 3 is a sectional view taken on line 3—3 of Fig. 1.
Figure 4:
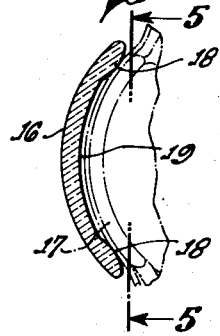
Fig. 4 is a sectional view taken on line 4—4 of Fig. 1, with the eyeball being shown only in phantom.

The lens 16 is generally made translucent and of optical correcting properties, although if desired optical correction may be introduced in the liquid space between lens and cornea. Also, the lens 16, or portions thereof, may be opaque for cosmetic or theatrical purposes. As best seen in Figs. 2 and 3, the horizontal meridian of the cornea 17 (Fig. 3) generally has a greater radius than does the vertical meridian (Fig. 2). This property of the cornea 17 adapts itself to the employment, in the instant invention, of four protuberant areas (Figs. 1 and 4) formed on the posterior or interior surface of the lens 16 (in this example on the cavity 19) and abutting the cornea 17 to stabilize the lens against the cornea. As illustrated in the door knob analogy above, the protuberant areas 18, coupled with the assymetrical surface of the cornea 17, serve to maintain the lens 16 in proper position against the cornea.

While the areas 18 have been pictorially illustrated as actually convex in their protuberance away from the concave posterior 19, it is to be understood as mentioned hereinbefore that they may be, and preferably are, flat facets, and may in fact, actually be slightly concave themselves as long as they are of greater radius than the concavity 19. The only requirement is that they protrude slightly out from the general contour of the concave posterior 19 itself. In the drawings, the areas 18 have been shown as actually convex in order more readily to demonstrate pictorially the structure and operation of the lens. In actual practice it is preferred to employ flat facets that set the lens out from the cornea just enough to produce a thin space between the lens and cornea, which is rapidly filled with lachrymal fluid flowing into the cavity 19 around the facets 18. This thin lachrymal fluid film, maintained uniform in thickness by virtue of the protuberant areas or facets 18, results in a corneal contact lens which has proven practically to be infinitely more comfortable than conventional corneal lenses, and which wearers report may be worn as much as ten times longer at one time without discomfort.

Use of the protuberant areas 18 also has the further advantage of giving a much wider tolerance in the formation of the concavity 19 formed on the inner surface of the lens 16. Thus, while the average cornea 17 is not a true sphere, the concavity 19 may, if desired, be actually made spherical, allowing the protuberant areas 18 to accommodate between the different radii in the horizontal and vertical meridians of the cornea. While this difference has been made appreciable in Figs. 2 and 3, for purposes of illustration, it is actually very slight, being in the order of a few per cent.

The slight spacing continuously maintained between the concave surface 19 and the cornea 17, by virtue of the presence of the protuberant areas 18, permits lachrymal liquid to constantly flow past the protuberant areas over the cornea thereby to keep the eye aerated.

Figure 5:
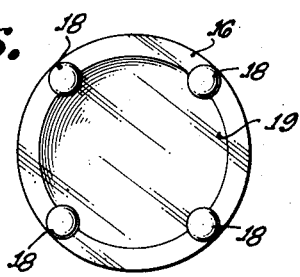
Fig. 5 is a view of the posterior or interior surface of the lens taken from line 5—5 of Fig. 4.

Fig. 5 illustrates that the protuberant areas may be placed adjacent the outer periphery of the lens.

If desired, and for certain optometric reasons the protuberant areas 18 may be moved inwardly from the edge as shown in Fig. 6.

While it is preferred to form the protuberant areas 13 circular, they may be truncated if desired adjacent the outer edge of the lens 16 as shown in Fig. 7.

The radius of curvature of the discrete protuberant areas may be and preferably is infinite, producing flat facets. Alternatively, the radius may be large as shown in Fig. 8, or may be small as shown in Fig. 9.

Also the protuberant area itself may be small as shown in Fig. 8, or may be relatively large as shown in Fig. 9. Selection of these variants depends upon the anatomy of the patient's eye.

While the lens with four flat facets discussed up till now is generally preferred for the average eye, there may be certain abnormal or scarred eyes in which lenses having any number of discrete protuberant areas may be employed to advantage, depending on the nature of the eyeball surface. Figs. 10, 11, and 12 illustrate one, two, and three facets, respectively.

The four-facet lens illustrated in Fig. 6 is generally used in conjunction with a spherical concavity 19 where the corneal cylinder is less than two diopters; that is, where the difference between the vertical and horizontal meridians is less than two diopters. In this case the spherical concavity fits even a slightly toric cornea, with the four facets contacting the cornea angularly midway between the vertical and horizontal meridians, as explained hereinbefore.

The single facet lens is used to advantage on a cornea where a surgical scar has left a depression in which the facet fits. In such a case the facet not only spaces the lens from the cornea to allow lachrymal flow and consequent comfort, but also serves to prevent the lens from slipping or rotating with eyelid movements.

The two-facet lens of Fig. 11 is preferred in combination with a posterior concavity 19 which is toroidal, instead of spherical, as discussed above. This lens is indicated where the corneal cylinder is greater than two diopters; that is to say, where the difference between the arc of the vertical meridian and the arc of the horizontal meridian is greater than two diopters. When such a cornea is encountered it is preferred to use a toric concavity and provide two protuberant areas or facets spaced on the meridian of lesser radius, which is generally the vertical meridian.

The three-facet lens of Fig. 12 is useful in cases of kerataconus where the cornea tends to assume a conic shape without particular symmetry. In this case three or more large facets placed on a spherical concavity 19 are generally indicated. The lens of Fig. 12 is particularly useful with corneas which have no measure of symmetry, because the three facets seat themselves on any surface, in the same manner that a three-legged stool may be placed without wobbling on any surface. A greater number of facets from five on up is used generally with a spherical concavity 19 for other types of eyes.

It is thus seen that toroidal corneas may be fitted with corneal lenses employing either or both features of the instant invention; that is, the lens may have a posterior concave surface which is toroidal, having different radii in the horizontal and vertical meridians; or the posterior concavity may be made spherical and provided with the protuberant areas or facets described above; or both features may be employed, i. e., a lens having a toroidal concavity and facets.

While the preferred form of the instant lens employs four protuberant areas, it will be readily understood from the above that any number of discrete protuberant areas or facets may be employed, depending on the particular corneal anatomy of the patient.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent articles.

This is a continuation-in-part of my co-pending application, Serial No. 186,188, filed September 22, 1950, for Contact Lens, and now abandoned.

What is claimed is:

1. A corneal contact lens of approximately the same area as the cornea of a human eye and having a posterior concavity defining a surface of pretermined regular curvature extending to the peripheral edges thereof, an even number of circumferentially spaced portions protruding inwardly of said concavity, said protruding portions being symmetrically disposed about the optical axis of said lens and adjacent the periphery thereof in position to simultaneously engage peripheral areas of the corneal surface of an eye to be fitted whereby said lens tends to assume proper orientation on said cornea when rotationally displaced about its optical axis.

2. A lens as defined in claim 1, wherein said concave surface is substantially spherical in shape and wherein there are four of said protruding portions.

3. A corneal contact lens of approximately the same area as the cornea of a human eye and having a concave posterior surface of predetermined regular curvature extending to the peripheral edges thereof, said surface having a predetermined radius of curvature in a first meridian plane and a lesser radius of curvature in a second meridian plane at right angles to said first plane, a pair only of relatively small areas of said lens protruding inwardly from the adjacent areas of said surface adjacent the periphery of said lens and in position to engage peripheral areas of the corneal surface of an eye to be fitted, said protruding portions being positioned at opposite ends of only one of said meridians, the other of said meridians being of such radius of curvature that at least the end portions thereof rest on said corneal surface.

4. A corneal contact lens of approximately the same area as the cornea of a human eye and having a concave posterior surface of predetermined regular curvature extending to the peripheral edges thereof, a plurality of discrete and circumferentially spaced portions of relatively small area protruding inwardly from said surface, said protruding portions being symmetrically disposed about the optical axis of said lens and adjacent the periphery thereof in position to simultaneously engage peripheral areas of the corneal surface of an eye to be fitted, each of said protruding portions defining a substantially flat facet extending chordally of said concave surface.

NOEL O. STIMSON.

References Cited in the file of this patent

UNITED STATES PATENTS

| Number | Name | Date |
|---|---|---|
| 2,129,305 | Feinbloom | Sept. 6, 1938 |
| 2,211,086 | Tillyer | Aug. 13, 1940 |
| 2,510,438 | Tuohy | June 6, 1950 |
| 2,544,246 | Butterfield | Mar. 6, 1951 |